Oct. 13, 1936.    C. C. MINTER    2,057,340
INTERNAL COMBUSTION ENGINE
Filed July 11, 1932
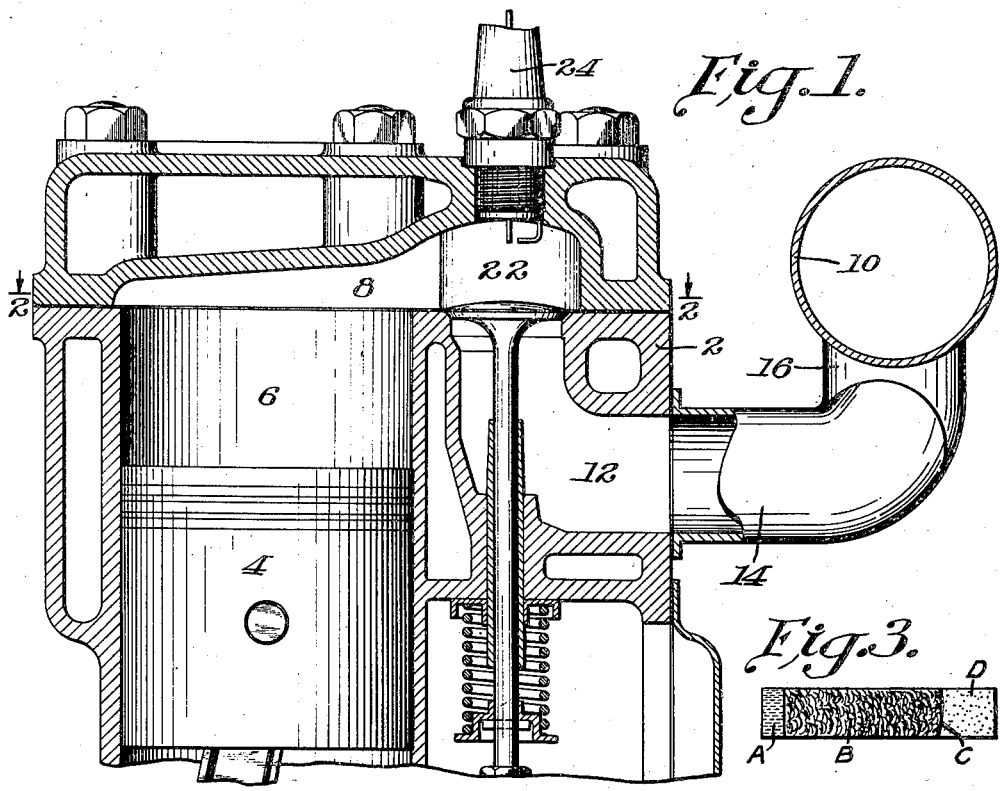
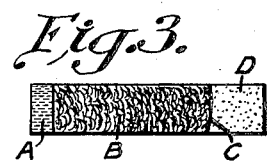
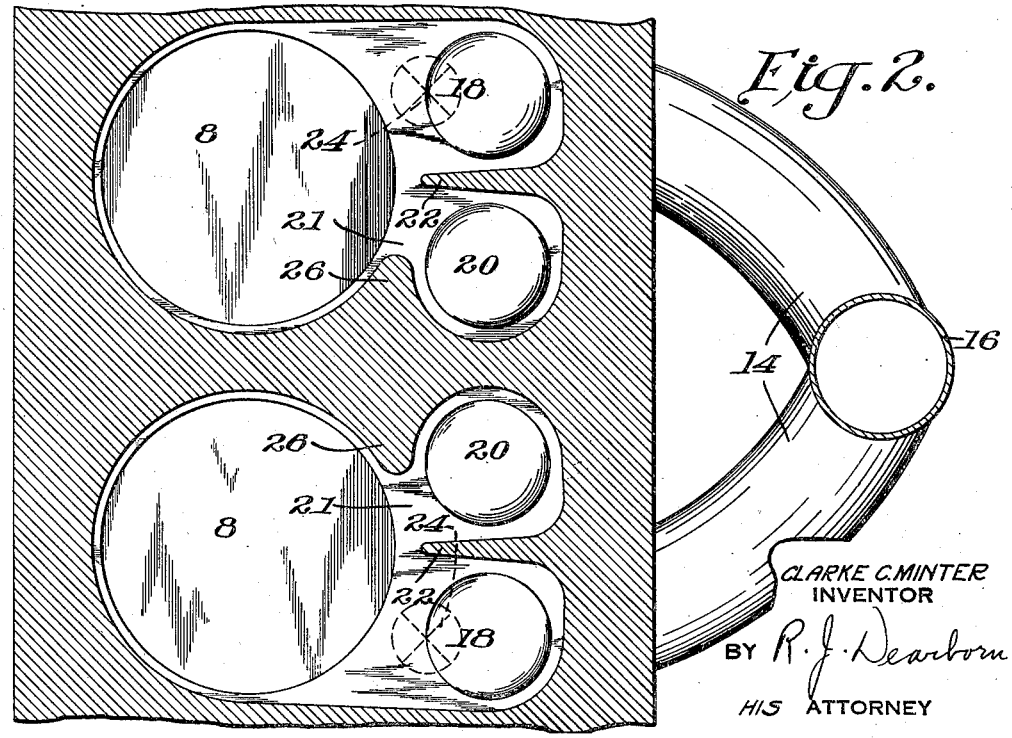
CLARKE C. MINTER
INVENTOR
BY R. J. Dearborn
HIS ATTORNEY Patented Oct. 13, 1936

2,057,340

UNITED STATES PATENT OFFICE 2,057,340

INTERNAL COMBUSTION ENGINE

Clarke C. Minter, Beacon, N. Y.

Application July 11, 1932, Serial No. 621,803

2 Claims. (Cl. 123—191)

This invention relates to improvements in internal combustion engines.

It is the primary object of the invention to provide a construction in internal combustion engines, particularly those designed for motor vehicle propulsion, which will reduce the tendency of the engine to knock under adverse driving conditions by providing a space within the combustion chamber containing relatively cool and substantially non-combustible materials to act as a cushion for absorbing the shock produced by the detonation of the last portions of the charge to burn.

The invention is concerned particularly with improvements in the design of combustion chambers in internal combustion engines to accomplish the desired objects.

The above and other objects of my invention will appear more fully from the following description when considered in connection with the drawing, in which:

Fig. 1 is a vertical sectional view of a portion of an internal combustion engine of the L-head type illustrating one form which my invention may assume;

Fig. 2 is a transverse sectional view on the line 2—2 of Fig. 1;

Fig. 3 is a diagrammatic illustration of the operation of my invention in suppressing the phenomenon of engine knock.

There is ample experimental evidence to show that the main cause of engine knock in internal combustion engines is due to self-ignition, ahead of the flame front, of the last portion of the charge to burn. The unburned portion of the charge is adiabatically compressed by the burning portion and, when the temperature and pressure due to this adiabatic compression become sufficiently high, the unburned portion self-ignites and produces engine knock. Under ordinary conditions this self-ignition of the unburned portion of the charge does not occur until substantially 90% of the total charge has been burned. But the detonation produced by even this small remaining part of the charge is sufficient to produce serious knocking in the engine.

It is the purpose of the present invention to reduce the knock by stratifying the gases in the combustion chamber so that a section of relatively cool and substantially non-combustible gases is maintained in a portion of the combustion chamber during the compression and burning of the fuel charge. The sudden increase in pressure due to the self-ignition of the last portion of the charge to burn merely compresses this relatively cool non-combustible gas, and this will result in effective absorption of the detonating effect produced by self-ignition.

In Figs. 1 and 2 of the drawing the engine block 2 is shown as provided with pistons 4, operating in the cylinders 6. The combustion chambers 8 communicate with the intake pipe 10 by means of the intake passages 12 and branched intake manifold 14, connecting at 16 to the pipe 10. According to this construction one intake passage 16 communicates with the two inlet passages 12 leading to the two adjacent combustion chambers 8, as shown. The intake valves 18 of each pair of cylinders are placed near the outer wall of the valve chamber, with respect to the central intake passage 14 for the two cylinders, in the path of the incoming fuel. The exhaust valves 20 are placed in the adjacent portions of the valve chambers for each set of two cylinders, the pockets 21 occupied by the exhaust valves being partially separated from the intake passages 12 by the walls 22, extending vertically through the valve chamber and inwardly into the same and substantially to the inner edges of the intake and exhaust valves, as shown. The spark plugs 24 are preferably placed in or near the path taken by the fuel mixture in passing to the several cylinders. The exhaust valves 20 are connected to exhaust pipes (not shown), similar to the intake manifold and pipes 10, 14 and 16, as is common in the art. The walls of the combustion chamber adjacent to the exhaust valves 20 are formed with inwardly projecting walls 26 for directing the gases past the pockets 21 during the compression stroke of the engine, thus preventing the gases constituting the fuel charge from sweeping through and removing the gaseous products of combustion in the pocket 21.

According to the construction described above, the incoming fuel mixture is moved in a curved path from the intake passage 16 into the combustion chambers during the suction stroke of the engine. During the compression stroke the gases constituting the charge are forced from the cylinder 6 into the confines of the combustion chamber proper, 8, and reduced to one-sixth or less of their former volume. During the compression of the charge the upwardly moving gases are prevented from entering the exhaust pocket 21 by the projecting walls 26.

During ignition of the charge with the constructions described herein, the fuel mixture is drawn into the compression chamber from the intake pipe and manifold in the usual manner. This fuel mixture, however, is subjected to a limited directing action as it passes from the intake pipe 16 into the combustion chambers 8 of the various cylinders, thus providing a relatively dilute portion of the fuel charge adjacent the exhaust pockets 21. This stratification of the fuel charge, with the combustible mixture remote from the pockets 21, combined with the effect of the substantially inert non-combustible gases in the pockets 21, causes the flame front during ignition of the charge to proceed more readily through the more combustible portions of the charge. The portion of the gases in the pockets 21 is thus reserved to act as a cushion for absorbing any final detonating effect of the ignition of the last combustible portion of each charge.

This condition is illustrated in the diagrammatic view, Fig. 3. The section A contains relatively cool products of combustion left over from the burning of the preceding cycle of the engine; section B represents the hot products of combustion produced as the flame front C spreads through the charge; and section D represents the last portion of the charge to burn. When the mixture in the section D self-ignites a shock is produced which would be transmitted to the walls of the combustion chamber, producing the phenomenon known as engine knock, if it were not for the absorbing action of the relatively cool products of combustion confined in section A serving as a cushion.

It will be understood that various modifications may be made without departing from the spirit of the invention, as set forth in the appended claims.

I claim:

1. In an internal combustion engine having a cylinder block, a cylinder bore therein, a reciprocable piston in said bore, intake and exhaust valves mounted at one side of said bore, a cylinder head cooperating with said block to form a combustion chamber and pockets for each of said valves, means forming an intake passage between the intake valve pocket and said cylinder bore, said means deflecting vapors passing from said intake valve pocket to said cylinder bore away from the exhaust valve pocket and means for directing the moving gases past the exhaust valve pocket on the compression stroke of the piston, said two means cooperating to substantially isolate said exhaust valve pocket.

2. In an internal combustion engine having a cylinder block, a cylinder bore therein, a reciprocable piston in said bore, intake and exhaust valves mounted at one side of said bore, a cylinder head cooperating with said block to form a combustion chamber and pockets for each of said valves, means forming an intake passage between the intake valve pocket and said cylinder bore, said means including a partition wall positioned directly between said valves and extending toward said combustion chamber to substantially the same extent as said valves for deflecting vapors passing from said intake valve pocket to said cylinder bore away from the exhaust valve pocket and means including an additional wall extending between said combustion chamber and the entrance to said exhaust pocket for directing the moving gases past the exhaust valve pocket on the compression stroke of the piston, said two means cooperating to substantially isolate said exhaust valve pocket.

CLARKE C. MINTER.